United States Patent [19]

Oye et al.

[11] Patent Number: 4,817,086
[45] Date of Patent: Mar. 28, 1989

[54] INTEGRATED SWITCHING SYSTEM AND ANNOUNCEMENT CIRCUIT

[75] Inventors: Kevin J. Oye, Red Bank, N.J.; Enzo Paterno, Staten Island, N.Y.; Thomas L. Smith, Lincroft, N.J.

[73] Assignees: American Telephone and Telegraph Company, New York, N.Y.; AT&T Information System Inc., Morristown, N.J.

[21] Appl. No.: 901,011

[22] Filed: Aug. 27, 1986

[51] Int. Cl.[4] .............................................. H04J 3/02
[52] U.S. Cl. .......................................... 370/85; 379/88
[58] Field of Search ...................... 370/85, 67; 379/88, 379/89

[56] References Cited

U.S. PATENT DOCUMENTS

| | | | |
|---|---|---|---|
| 4,356,351 | 10/1982 | Shefler et al. | 179/1 B |
| 4,371,752 | 2/1983 | Matthews et al. | 179/7.1 TP |
| 4,389,720 | 6/1983 | Baxter et al. | 370/62 |
| 4,438,296 | 3/1984 | Smith | 179/6.10 |
| 4,446,336 | 5/1984 | Bethel et al. | 179/6.10 |
| 4,475,189 | 10/1984 | Herr et al. | 379/88 |
| 4,535,448 | 8/1985 | Baxter et al. | 370/85 |
| 4,549,047 | 10/1985 | Brian et al. | 179/18 B |
| 4,554,418 | 11/1985 | Toy | 379/88 |
| 4,580,012 | 4/1986 | Matthews et al. | 179/18 B |
| 4,581,486 | 4/1986 | Matthews et al. | 179/18 B |
| 4,640,992 | 2/1987 | Rose | 379/89 |
| 4,663,777 | 5/1987 | Szeto | 379/88 |

Primary Examiner—Douglas W. Olms
Attorney, Agent, or Firm—David H. Tannenbaum; David R. Padnes

[57] ABSTRACT

There is disclosed a call announcement circuit arranged for connection to a communication system via a voice (or data) path and also via a separate control channel. Using this arrangement, the system main processor can control the message delivery capacity of the announcement circuit since the circuit has direct access to the internal system buses. This configuration allows detailed control of the announcement circuit on channels separate from the communication channel.

22 Claims, 9 Drawing Sheets

| COMPRESSION | BYTE ORDERING BOX /705 | | |
|---|---|---|---|
| | INPUT | OUTPUT | |
| 64 KB/S (NO COMPRESSION) | B7 B6 B5 B4 B3 B2 B1 B0 | B7 B6 B5 B4 B3 B2 B1 B0 | |
| 32 KB/S (2:1 COMPRESSION) | B7 B6 B5 B4 B3 B2 B1 B0 | B3 B2 B1 B0 X X X X<br>B7 B6 B5 B4 X X X X | |
| 16 KB/S (4:1 COMPRESSION) | B7 B6 B5 B4 B3 B2 B1 B0 | B1 B0 X X X X X X<br>B3 B2 X X X X X X<br>B5 B4 X X X X X X<br>B7 B6 X X X X X X | |

INTEGRATED SWITCHING SYSTEM AND ANNOUNCEMENT CIRCUIT

BACKGROUND OF THE INVENTION

This invention relates to announcement systems and, more particularly, to such systems which provide flexible system control.

In the past, recorded announcements have been provided via stand-alone equipment containing stored voice messages that were connected to the switch via an analog line or trunk. The messages have been stored in analog form on magnetic media (such as a tape or magnetic drum) or, in one recent case, the analog message signal from the switch has been digitally encoded and stored in the announcement equipment. In all cases, control of the announcement equipment has been limited by the sophistication of the signalling that can be done via an analog line or trunk.

In the most limited case, the announcement equipment appears as a conventional telephone to the switch. Thus, when the switch is directed to connect a customer to an announcement, it "calls" the announcement equipment. The announcement equipment, in response to the incoming call from the switch, answers the call and plays the announcement. When attached to a trunk, the switch can signal the announcement equipment to start playing a message by using trunk signalling techniques, e.g., winking or flashing, or seizing, the trunk to notify the equipment when to start playing the announcement.

In the most sophisticated case, the equipment still appears like a conventional telephone but, when the equipment answers the call, it accepts multi-frequency (MF) signalling from the switch to control the announcement. In most cases, however, each separate announcement requires a separate piece of announcement equipment and a separate line, or trunk, to the switch. More advanced announcement equipment has been designed to store more than one announcement, but they still associate one storage area with each announcement, e.g., equipment with four announcements require four separate areas on a recording drum. Therefore, the announcement playback scenarios are limited in complexity to whatever capabilities the switch has for connecting a single fixed announcement to a call.

One problem with such systems is that they lack flexibility to handle complex situations. One such example is the situation where it is desired to change the message depending upon some external event, such as an overload at a call answering system. This same type of situation can occur, for example, when a calling party is placed in an answering queue and it is desired to give the party an accurate assessment of the waiting time. Under this condition, not only must the message change from time to time, even while the calling party remains connected, but a large number of announcements would have to be stored in an announcement circuit, each available to be played to the calling party over any line at any time. Under existing systems, even assuming that the announcement circuit would have enough memory capacity for a large number of messages, and enough line or trunk circuits to connect the announcement circuit to the system, it would remain impossible to change the message once a connection to a particular message is made.

SUMMARY OF THE INVENTION

These and other problems have been solved with an announcement circuit that is integrated with the communication system via a control channel and, in one embodiment, resides in a system port slot thereby providing direct access to the internal buses of the communication system.

One such bus provides a channel for the exchange of control and status information between the communication system and the announcement circuit while a second bus provides the connectivity for multiple voice channels between the announcement circuit and the communication system.

In one time division environment, these buses are the time division multiplexing bus (TDM bus) and the control channel bus. In such an environment, the announcement circuit has four major components, namely (1) network interface: circuitry to mate the announcement circuit to the TDM and control channel buses; (2) announcement control processor: processor complex to control and interpret the exchange of system messages for the recording and playback of announcement messages; (3) encoder/decoder: circuitry to provide sixteen independent conversion resources; and (4) announcement memory: circuitry used to store digitized speech samples.

To record a message, the central system call processing instructs the announcement circuit, called ANN, as to the time slot the incoming speech will be on. Through the network interface circuit, ANN picks up the 64Kb/s digital pulse code modulated (PCM) samples from the TDM bus. ANN feeds these samples through the encoder/decoder which can, under control of call processing, take the speech samples and pass them straight through to the announcement memory or compress them, for example, to 32, 24, 16 or 8Kb/s samples. The samples coming out of the encoder/decoder are then stored in the announcement memory. Compressing the samples simply means they will take fewer memory bits to store.

To play back an announcement, system call processing tells ANN which announcement and which time slot(s) to play the announcement message back on. ANN retrieves the stored samples from its speech memory, runs them through the encoder/decoder which, if necessary, expands them back to their original PCM sample size, and then places the PCM samples on the appropriate TDM bus time slots through the network interface circuit.

A major advantage of our system arrangement is that the main communication system communicates with the announcement circuit over a communication bus which is essentially a message-based control channel. Under this arrangement, the system can pass data back and forth between itself and the announcement circuit thereby allowing a high degree of flexibility of message presentation. For example, a high speed main memory can be used to store large numbers of messages, some of which may be used only infrequently. Upon the occurrence of certain events which may be related to the status of the particular call connected to the announcement resource or which may be related to the status of the communication system as a whole, certain of these messages could be downloaded from the main system memory over the message-based control channel to the announcement circuit and then immediately played to the calling customer without requiring a new announcement connection to be made to the calling customer.

As another example, the amount of available (unused) storage can be sent in a message from the announcement circuit to the communication system. The communication system can determine whether any action is necessary to increase the available storage through a variety of mechanisms including compressing existing messages or putting infrequently used messages on a backup storage device.

Using this arrangement, a degree of flexibility is achieved that has been nonexistent prior to this time. For example, the announcement circuit, which is the subject of our concurrently filed, co-pending patent application Ser. No. 901,003, filed Aug. 27, 1986, which application has a common assignee and which patent application is hereby incorporated by reference herein, discloses a circuit having variable data compression capability. In that circuit, it is possible to record announcements for subsequent playback at various data compression rates, dependent upon the capacity of the memory and the desired announcement quality. By combining the two disclosures, it is possible to arrange a system where, as the announcement memory reaches its capacity, some messages are removed and re-recorded using a higher compression rate and where the original message is transferred, via the control channel, to the system main memory for use at a subsequent time when the demand for announcement memory is reduced. Another method of saving storage in memory is to make up the announcement from a group of pre-stored words, all under control of the processing capability of the main system.

BRIEF DESCRIPTION OF THE DRAWINGS

These and other objects and features, together with the operation and utilization of the present invention, will be more apparent from the illustrative embodiment shown in conjunction with the drawings in which.

DETAILED DESCRIPTION

Figure 1:
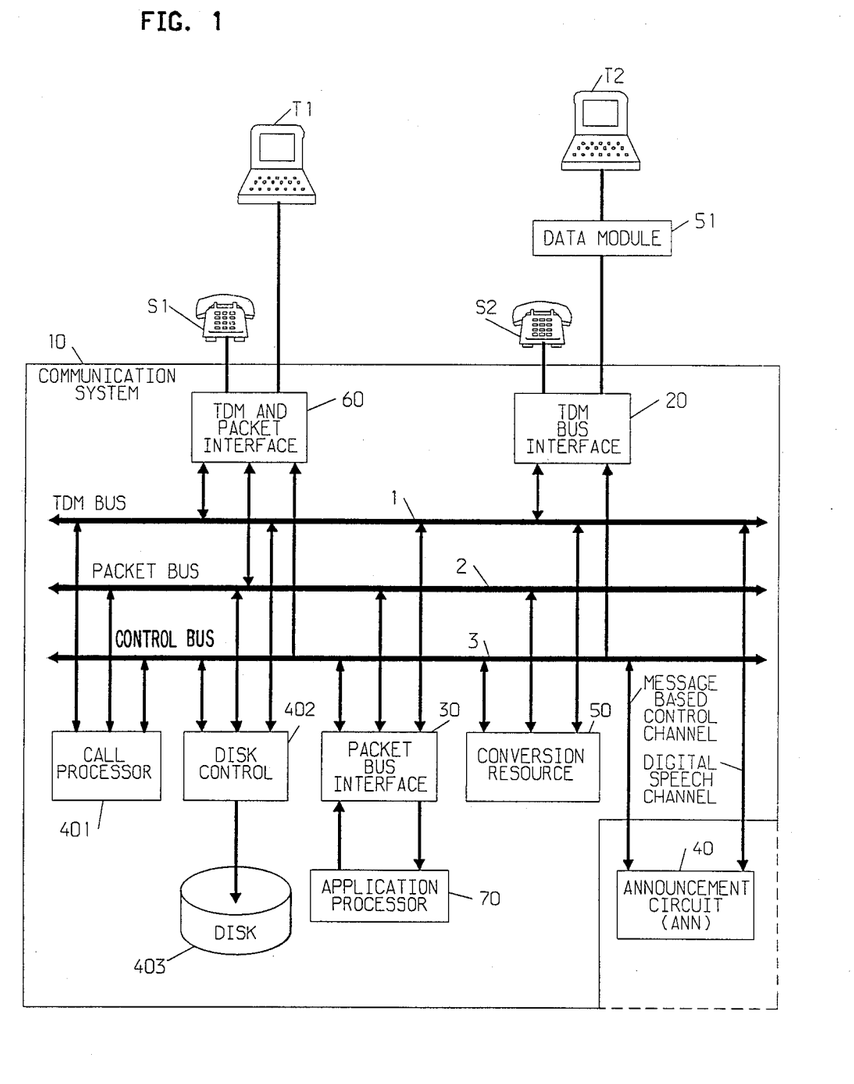
FIG. 1 is a block diagram of a system in which our invention can be used.

FIG. 1 shows a block diagram of one embodiment of our invention where announcement circuit (ANN) 40 is shown connected to TDM bus 1 and control bus 3 of communication system 10. The communication system bus structure shown in FIG. 1 is similar to the communication system bus structure described in U.S. Pat. No. 4,535,448, dated Aug. 13, 1985, which patent is hereby incorporated by reference herein. ANN 40, which advantageously can be mounted on a plug-in board and inserted into a particular slot on a printed wiring housing (not shown) or which can be remotely located from the communication system, contains many, for example sixteen, separate announcement circuits.

Each circuit, when directed over the control channel, can either pick up PCM samples from the TDM bus (i.e., record an announcement) at a pre-defined compression rate or retrieve stored speech samples from the circuit's memory array and expand them into 64Kb/s PCM samples. ANN 40 can record one announcement at a time but can play back up to sixteen simultaneously. Communication system 10 sends messages to and receives messages back from ANN 40 via the message-based control channel. This channel can be used to direct ANN 40 to send messages via TDM bus 1 to disk control 402 for long term storage on the disk. Messages stored on disk 403 can be sent to ANN 40 over TDM bus 1 all under control of messages communicated between call processor 401 and ANN 40 over packet bus 2.

One embodiment of an announcement circuit using our invention will now be discussed with reference to FIGS. 2 and 3.

Figure 2:
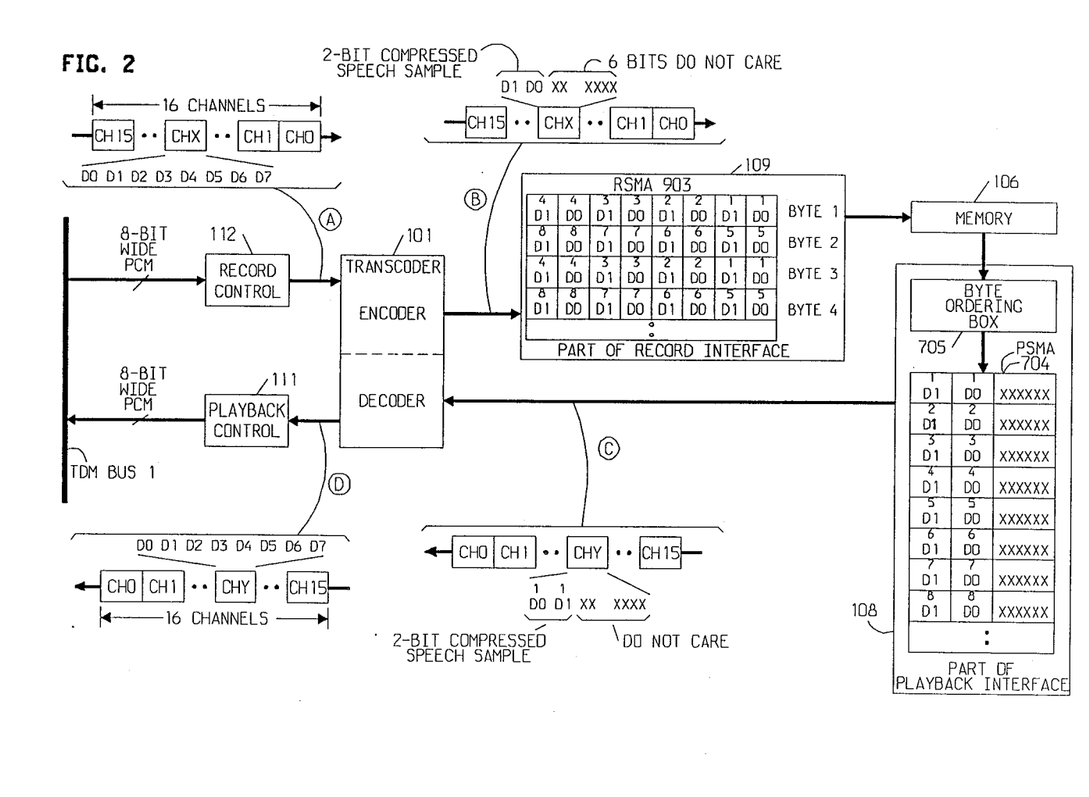
FIG. 2 shows in block diagram form the operation of one embodiment of an announcement circuit.

FIG. 2 shows a visual picture of what happens to a speech sample from the time it is retrieved from TDM bus 1 (record) to the time when it is placed back on TDM bus 1 (playback). The example shown will highlight the ANN circuit operating to compress data and store the data (announcement) in non-contiguous memory locations.

Scenario 1. 16Kb/s record/playback sessions.
2. Recording channel is CHX.
3. Playback channel is CHY.

RECORD

Hardware Set Up

Call processor 401 sends a message to circuit processor 103 over the message-based control channel instructing it to record a message and providing it with information necessary to record the message such as which channel to record from (CHX), the compression rate (16Kb/s) and a message identification number.

Circuit processor 103 activates the network record interface in record control 112 for recording an announcement.

The system is configured for 16Kb/s recored session on CHX.

Starting from the top left of FIG. 2, the 8-bit (D0-D7) PCM sample from TDM bus 1 is picked up by record control 112 which multiplexes it onto channel CHX in the serial input stream into the encoder 101. This is shown in blow-up A.

Encoder 101 compresses the 8-bit sample into a 2-bit sample and outputs the sample (D0-D1) and discards the other six bits of the sample on its serial output line in the CHX time slot. This is shown in blow-up B.

To make efficient use of the speech memory, the 2-bit sample is then concatenated with four other samples of two bits each into 8-bit words by recored interface 109. Buffer memory RSMA 903 is shown with byte 1 having samples 1, 2, 3 and 4, each with bits D0 and D1. The bytes are then moved to memory 106 for storage. This will give storage at 16Kb/s which is a 4:1 compression rate. If this concatenation were not done, there would be no saving of memory space with compressed message samples.

When the recording is concluded, call processor 401 sends a message to circuit processor 103 over the message-based control channel instructing it to stop recording. Announcement circuit 40 is configured to stop recording and a message is sent from circuit processor 103 to call processor 401 over the control channel verifying the successful recording to the announcement and giving other pertinent data including the time duration of the recorded announcement and the remaining space available for additional announcements.

To play back an announcement, call processor 401 sends a message to circuit processor 103 over the message-based control channel instructing the announcement resource to play back a particular message over a specific channel (CHY).

To play back the compressed message, the 8-bit word bytes, each containing four compressed PCM samples, are read out of memory 106 into playback interface 108. Byte ordering box 705 separates each of the 2-bit compressed speech samples (D0-D1) of each byte into four consecutive locations of buffer called the PSMA buffer. Each 2-bit sample has added to it six "do not care" bits for transmission purposes since decoder 101 expects to see 8-bit words in each of the sixteen time slots. The decoder is designed to know that is expanding 2-bit samples (with six "extra" bits), as shown in blow-up C, into 8-bit samples. Therefore, while PSMA 704 passes 8-bit samples on the CHY time slot, decoder 101 only looks at the first two bits in the CHy time slot to create a PCM 8-bit word which is a reconstructed data sample, as shown in blow-up D.

Playback control 111 picks up the serial output of decoder 101 and transfers it to the appropriate time slot on TDM bus 1.

Figure 4:
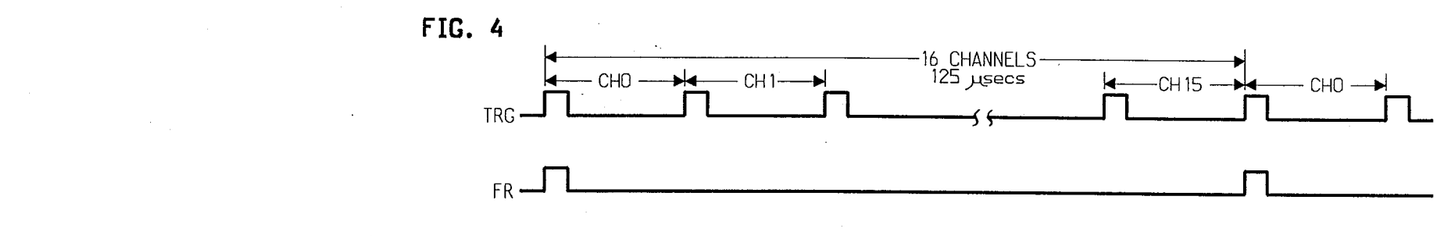
FIGS. 4 and 5 are timing charts of the embodiment shown in FIG. 3.

Transcoder 101 expects on its serial input line from memory 106 sixteen channels of speech every frame cycle (i.e., 125 $\mu$secs). This is shown in FIG. 4. Each channel (CH0-CH15) contains two, four or eight bits of digital information, depending on the chosen compression rate.

Figure 5:
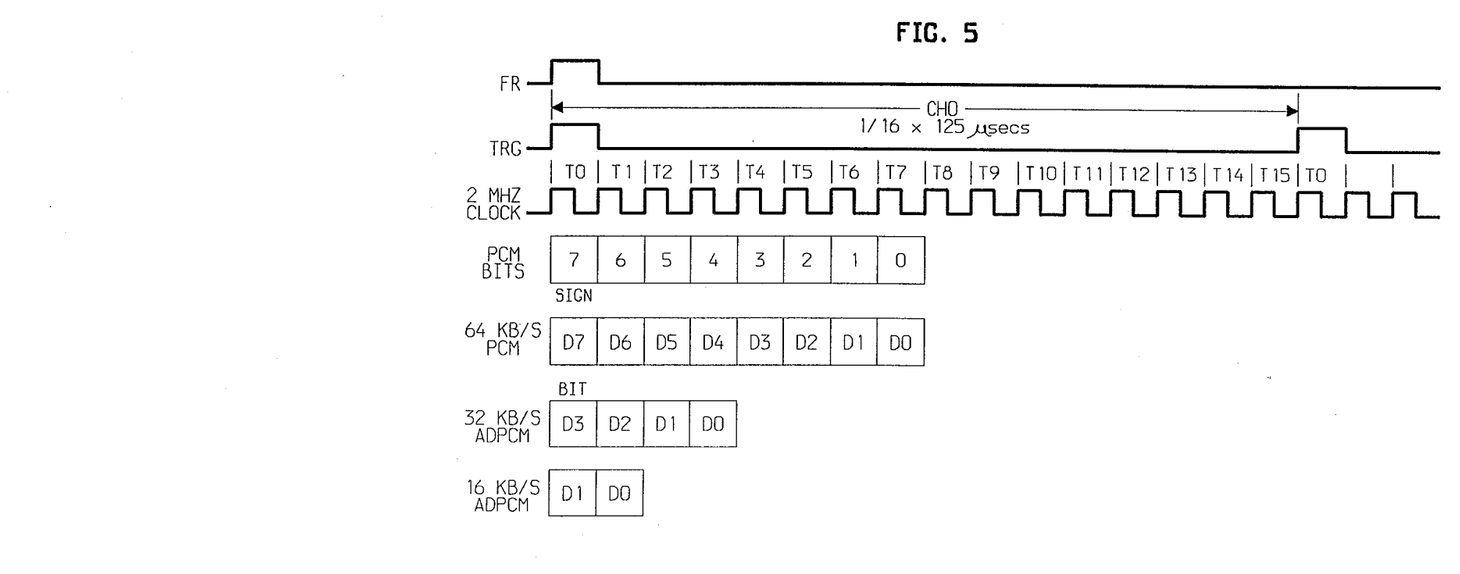

FIG. 5 shows one channel (channel CH0) broken into sixteen arbitrary units by the 2 MHz clock signal. For 64Kb/s, eight time units are used to provide a message sample of eight bits. As discussed above, this gives no compression. For 32Kb/s, four bits are transferred to or from the buffer and, for 16Kb/s, two bits are transferred.

Immediately after the announcement has been played back, circuit processor 103 sends a message to call processor 401 indicating the announcement message has been played to completion and that the calling party is ready for the next stage of call processing.

Figure 3:
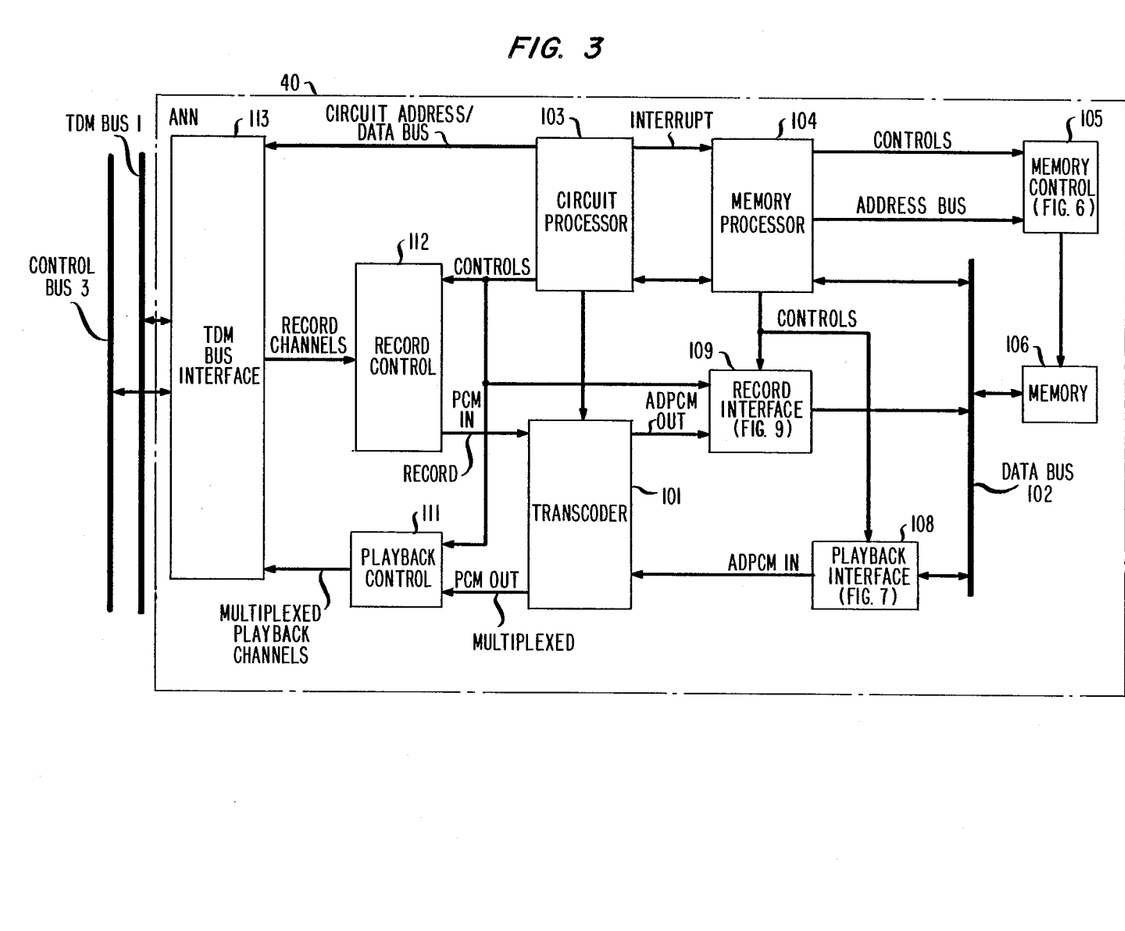
FIG. 3 shows details of one embodiment of an announcement circuit.

FIG. 3 shows a more detailed block diagram of the announcement circuit. A brief description of each block follows.

Transcoder 101 accepts PCM/ADPCM samples and compresses (or expands) the samples using Adaptive Differential Pulse Code Modulation (ADPCM) to provide sixteen independent channels multiplexed onto serial input/output lines. Transcoder 101 supports compression (or expansion) rates of 65Kb/s (no compression, pass-through mode), 32Kb/s (2:1 compression mode) and 16Kb/s (4:1 compression mode). The input PCM code words can be either A or MU-LAW format, as specified by the user. Transcoder 101 defaults to MU-LAW, unless otherwise instructed.

Circuit processor 103 provides the necessary per-channel controls, such as compression rate and record/- playback mode. Included in this circuit is a dual port RAM(DPR). This array is accessed asynchronously by circuit processor 103 on one input and read synchronously by transcoder 101 and by record control 112.

Circuit processor 103 also includes a microprocessor, such as an Intel 8031, 16K of program ROM and 8K of RAM. The processor manages board operation by being the control channel message interface to call processing, by running maintenance tests and by overseeing the operation of memory processor 104.

In this particular implementation, memory 106, which stores the messages, contains one megabyte of dynamic RAM. The memory array, as will be seen, requires eighteen lines for row/column addressing and two lines for bank selection. Access and refreshing of the memory array is accomplished via memory control 105. An Intel 8031 processor is used in memoryprocessor 104 for controlling the recording and playing of messages to and from the memory. Only announcement messages are stored in the dynamic announcement memory 106, and all control code structures and pointers used for control purposes (e.g., link lists) are stored in static memory within circuit processor 103, memory processor 104 or memory control 105.

The size of memory 106 bounds the total amount of message data (and, thus, announcement length) that can be stored. This space is flexibly dividable among any number of different announcement messages whose lengths may vary. As discussed, the storage space for each message is a function of the compression rates chosen for the various recorded message announcements. For the embodiment shown, the maximum message times are 2 minutes 8 seconds (all messages stored at 65Kb/s), 4 minutes 16 seconds (all messages stored at 32Kb/s) and 8 minutes 32 seconds (all messages stored at 16Kb/s). Of course, larger memories could be used to give other storage times.

As discussed, the announcement system allows flexible message lengths and the announcements will be stored such that any single announcement can be of any length, up to the maximum memory space available. Individual announcements are re-recordable or replaceable without any restriction on the length of the replacement message other than that it must be able to fit in the unused space in memory 106.

Figure 6:
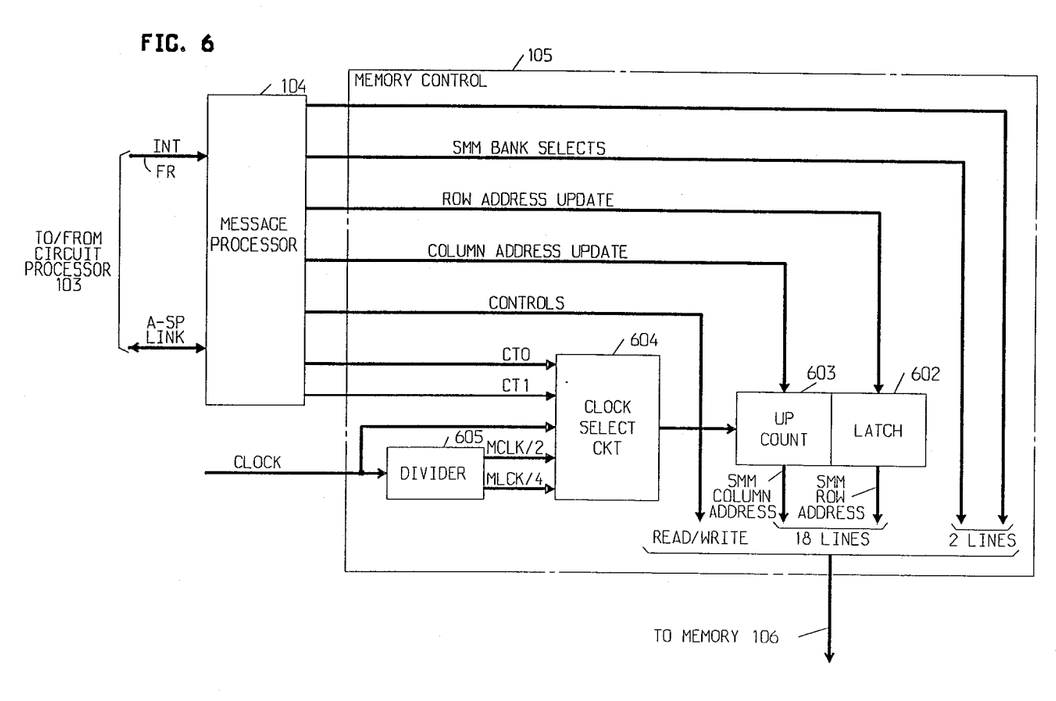
FIGS. 6 and 7 show details of various circuits of the announcement circuit.
Figure 7:
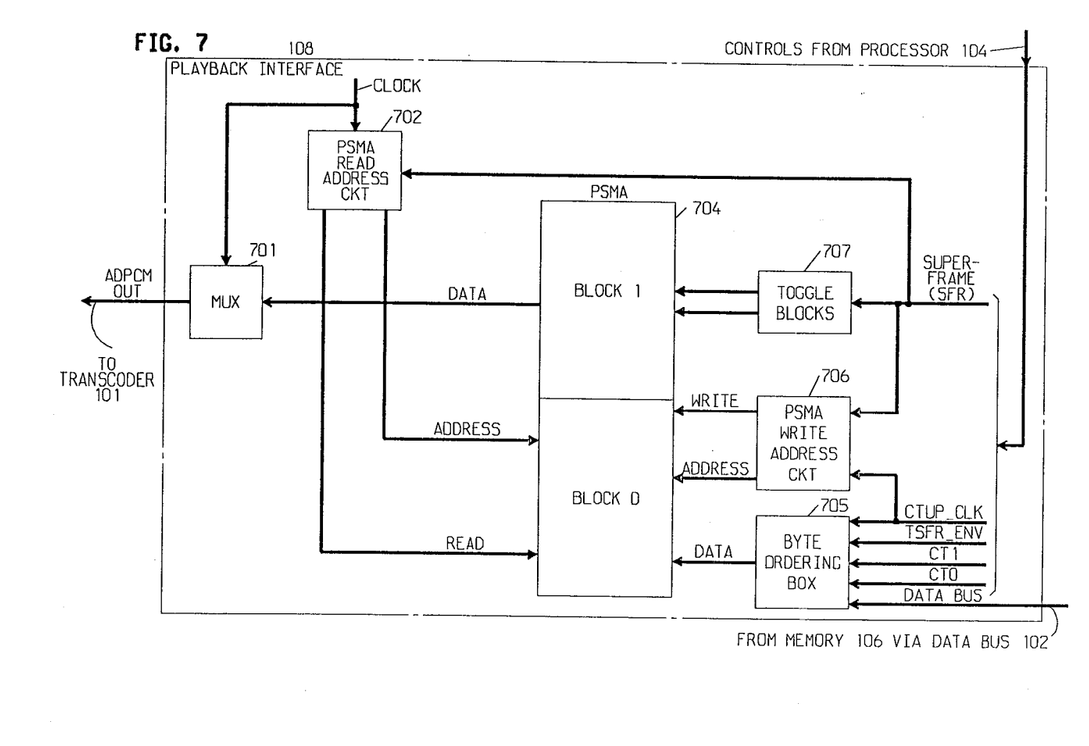

FIG. 6 shows the structure of memory control 105 which solves the real time constraint of retrieving one speech sample every 7.8 $\mu$secs from memory 106. To alleviate processing time burden on memory processor 104 when interacting with memory 106, recording or playback of a message is accomplished via block transfers between memory 106 and playback interface 108, as shown in FIG. 7.

In the block transfer mode, memory processor 104's major task is to provide to memory control 105 for each record or playback session the starting address of the block to be transferred in or out of the memory. During each block transfer, sixteen speech samples must be retrieved. However, since the speech samples may be compressed, the number of bytes transferred during a single block transfer will vary depending on the compression rate. For example, if the 8-bit message samples were compressed to 4-bit samples, then only eight bytes would need to be transformed to yield sixteen 4-bit samples. This is controlled by message processor 104 via memory control 105.

Figure 10:
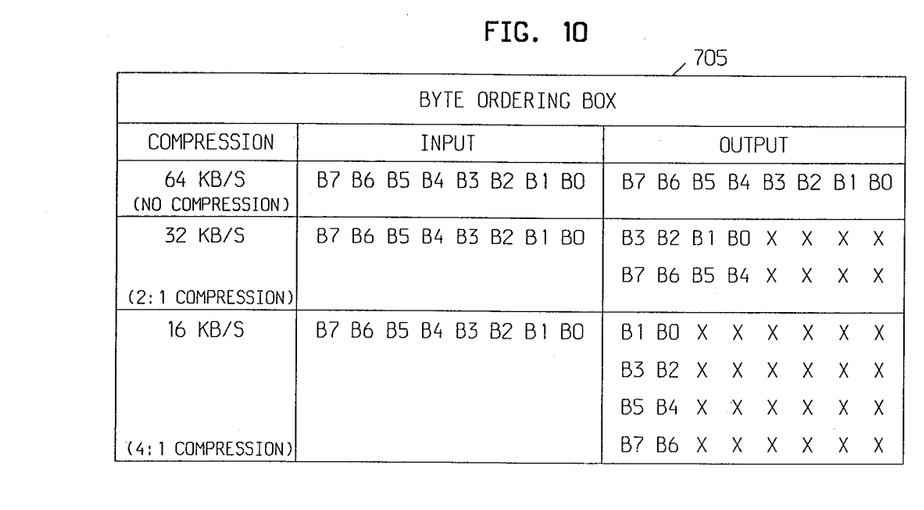
FIG. 10 shows the organization of data for the announcement memory.

Since memory 106 is an 8-bit/byte word array, the recorded message samples are stored in the memory one word (byte) at a time regardless of the compression rate. However, as discussed above, each byte may have one, two or four data samples depending upon the compression rate. Therefore, it is necessary, when reading data out of the memory, to transform the 8-bit output words into the original sample sizes of 2-, 4-, or 8-bits/speech sample. This conversion is performed by playback interface 108 (FIG. 7) where byte ordering box 705 performs this task with the format shown in FIG. 10. Thus, as shown for each block transfer, the number of bytes out of byte ordering box 705 is always sixteen even though the number of input bytes varies.

Since the system expects sixteen channels of data per frame and the message processor provides sixteen bytes of data per frame for each specific channel, a buffering mechanism is used to collect the byte ordering box output speech samples and multiplex them via multiplexer (MUX) 701 (FIG. 7) to the input of transcoder 101. This task is performed by buffer memory PSMA 704. This memory array consists of a 512×8 dual port RAM. The PSMA is partitioned into two blocks, each block 256 bytes deep with each block containing sixteen 16-byte buffers.

Figure 8:
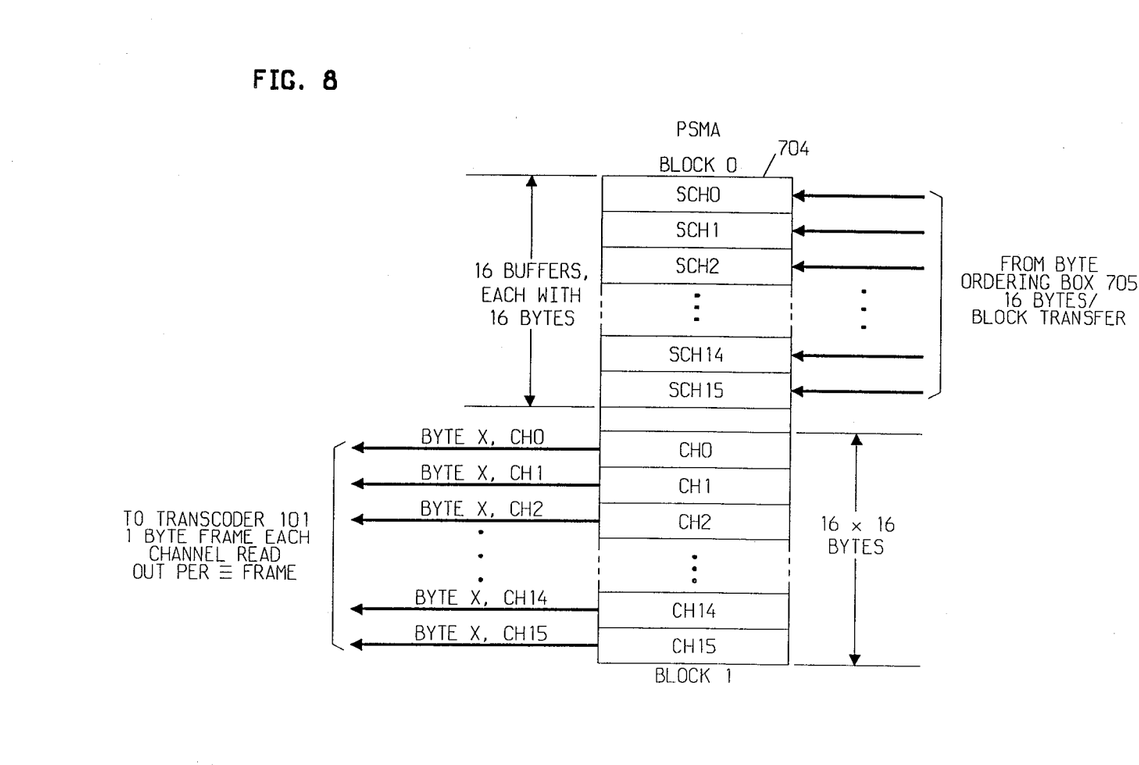
FIG. 8 shows a memory arrangement.

The PSMA interface is designed such that when one block is written the other block is read simultaneously. This is possible since the time required to write one block equals the time to read the other block (i.e., 16 frames=2 msecs=256 bytes). Upon completion of processing a block (i.e., write or read), the block positions are interchanged. The previously written block is now read and the previously read block is now written by the byte ordering box with new speech samples. The operation of PSMA 704 is shown in more detail in our co-pending, concurrently filed patent application Ser. No. 901,004, filed Aug. 27, 1986, which application also has a common assignee and which is hereby incorporated by reference herein. FIG. 8 shows the alternate arrangement of data in the PSMA buffer blocks.

Figure 9:
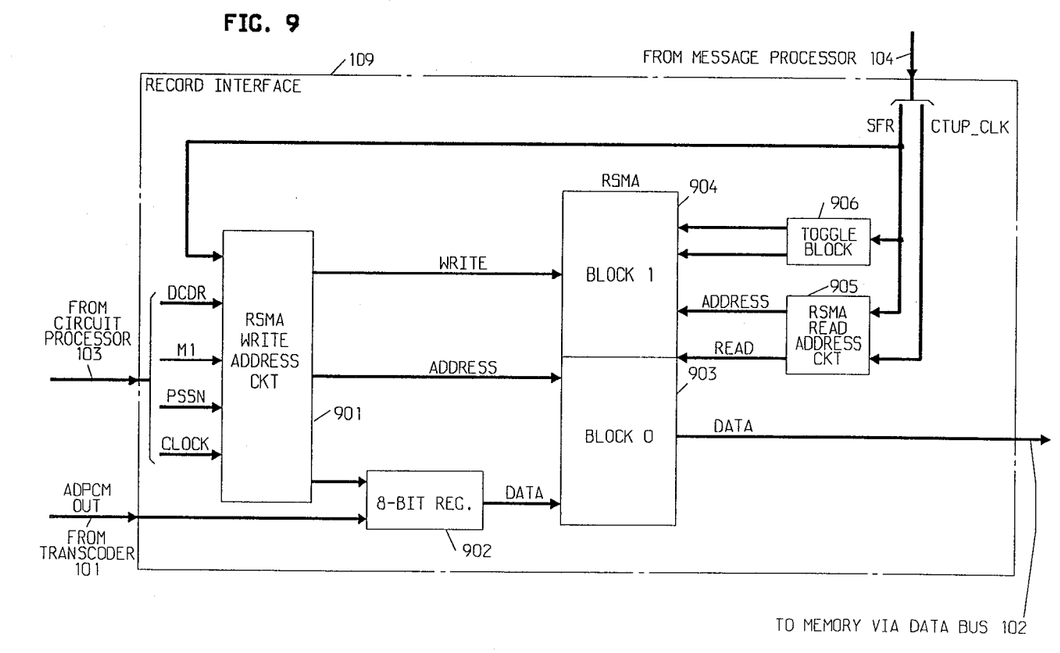
FIG. 9 shows details of the record circuit of the announcement circuit.

For recording messages, record interface 109, FIG. 9, works in the opposite direction from playback interface 108 and demultiplexes the ADPCM samples from transcoder 101 serial output and transfers the demultiplexed signals to memory 106. Record interface 109 directs the channel output ADPCM out samples into dual-ported two block buffer RSMA 903. Since memory 106 is an 8-bit wide memory array, RSMA 903 acts as a buffer to collect the samples and to form full 8-bit words for all compression rates.

Announcement circuit 40 (FIG. 1) allows only one recording session at the time and, thus, the recording channel will be processed every 2 msecs (i.e., every 16 frames) by message processor 104. During that 2 msec period, the number of data bytes stored in RSMA 903 varies, as discussed above, as a function of the compression rate.

From the message processor point of view, the block transfer protocol for recording is the same as for playback and, thus, the only difference is that the processor is now writing to the memory instead of reading from the memory.

Returning to FIG. 3, TDM bus interface 113 consists of four network processing elements (NPE's) which provide sixteen access points to the TDM bus for the sixteen channels. The NPE's can be constructed in the manner set forth in U.S. Pat. No. 4,389,720, dated June 21, 1983, which patent is hereby incorporated by reference herein. Circuit processor 103 can be constructed in the same manner as the microprocessor controller shown in the aforesaid patent.

Playback control 111 multiplexes the sixteen channels from transcoder 101 onto sixteen serial NPE channels. The NPE's then convert each of their serial inputs into 8-bit parallel outputs.

The system can be expanded, as necessary, to hold more data by changing the compression rate of already stored data. In this regard, call processor 401 would determine that the currently available message recording space is inadequate for the needs of the immediate future. Call processor 401 would instruct announcement circuit 40 to play back an existing announcement, and simultaneously record it at a higher compression rate. The space occupied by the original announcement can now be freed for additional announcements. If it is desired to use the first higher quality version of the announcement at a later time when the demands for announcement storage are smaller, the first version of the announcement can then be sent, via TDM bus 1, FIG. 1, under control of call professor 401 to disk 403 via disk control 402 for storage. This stored message, along with any other stored message, can be transferred to ANN 40 by reversing the process. Thus, the system can adapt, as needed, to the demand for storage space by compressing data only when there is a shortage of memory capacity One expanded use of our system would be to replace terminal T2 (FIG. 1) with an intelligent terminal or personal computer, such as the AT&T PC6300. In this regard, data and announcement messages can be stored, retrieved and manipulated by a user substantially independent from the main system.

Conclusion

The major advantage of this invention is the message-based control channel which is used to send control and status messages between the communication system and the announcement resource. This allows a tighter coupling of the audio announcements with the needs of the communication system and permits the implementation of many substantially more sophisticated features than previous systems which were linked only by voice channels and trunk-like signalling.

The system described uses a direct digital interface to record and play back announcements. There are advantages to such a digital arrangement because there is no degradation when messages are rerecorded several times. However, one skilled in the art could also build other announcement systems which have the advantages of the message-based control channel even though the voice interface to the communication system is analog and the conversion to digital form is performed inside the announcement system.

While our invention has been shown in conjunction with a particular announcement system, it could be used by one skilled in the art for any number of announcement systems. Although the embodiment discussed is one where the announcement system is integral to the communication system, the same concepts are applicable where the announcement circuit is external to the communication system. Also, the example discussed uses two separate busses: one for control messages and one for voice channels. It is easy to envision an implementation where the two busses share the same physical implementation.

Other types of arrangements are also possible, such as, for example, a video storage system where images, perhaps pages of a video catalog, are stored in a compressed format and made available over any number of channels to users via a temporary video image resource similar to ANN 40.

What is claimed is:

1. A communication system comprising,
   at least one bus, each carrying messages which have been time-division multiplexed into a plurality of recurring channels,
   means for exchanging said messages over said bus,
   an announcement circuit comprising
   memory means,
   means for storing announcement messages in said memory means, said storing means storing announcement messages from said communication system appearing on said bus in at least one channel of said plurality of channels, said storing means also compressing predetermined ones of said announcement messages prior to storing in said memory means to conserve space therein, each of said predetermined announcement messages being compressed by one of a plurality of different compression factors,
   means for retrieving any one of said stored announcement messages, said retrieved announcement messages provided to said communication system via said bus in at least one other channel of said plurality of channels, and
   means operative in response to control messages communicated from said communication system over said bus for controlling said storing and said retrieving means.

2. The communication system set forth in claim 1 wherein said communication system contains system memory means separate from said announcement circuit memory means and controllable by a communication system processor, and
   means responsive to said communication system processor for storing retrieved announcement messages in said system memory.

3. The communication system set forth in claim 1 further including
   system memory means separate from said announcement circuit memory means and controllable by a communication system processor,
   means responsive to said communication system processor for retrieving announcement messages from said system memory, and
   means for transmitting said retrieved announcement messages to said announcement circuit memory.

4. The communication system set forth in claim 1 wherein said communication system includes means for selectively modifying messages retrieved from said announcement circuit memory, and
   means for substituting in said announcement circuit memory means a particular one of said modified messages at a specific location in said announcement circuit memory where said particular message was previously stored.

5. The communication system set forth in claim 1 wherein a communication system processor is operable for selectively modifying any said stored announcement message.

6. The communication system set forth in claim 1 further comprising a processor independent from both a system processor and an announcement circuit processor, said independent processor having a communication link to said communication system, and
   means responsive to control messages from said independent processor over said communication link for controlling the exchange of announcement messages to and from said announcement circuit.

7. The communication system set forth in claim 1 further comprising a processor independent from both a system processor and an announcement circuit processor, said independent processor having a communication link to said communication system, and
   means in said independent processor responsive to control messages from said system processor for storing and retrieving announcement messages in said independent processor.

8. The communication system of claim 1 wherein said exchanging means exchanges control messages onto at least one control channel on said bus and said controlling means is responsive to said control messages on said control channel.

9. The communication system of claim 1 wherein each announcement message has a size and said retrieving means expands each of said predetermined ones of said announcement message to its size prior to compression.

10. A message delivery circuit for use in a communication system having a central processing unit, a plurality of line circuits for connecting said communication system to a plurality of communication lines, said central processing unit, line circuits and said message delivery circuit connected together via a system bus, said message delivery circuit comprising
    data storage means,
    means for receiving and transmitting message delivery data over one of said communication lines,
    means controlled by control data on said system bus from said central processing unit for storing said message delivery data in said storage means at any unused data storage positions within said data storage means and retrieving said message delivery data from said storage means, and
    means controlled by said control data from said processing unit for retrieving selected ones of said message delivery data from said storage means in lieu of stored message delivery data associated with control signals received via said line circuits.

11. The message delivery circuit set forth in claim 10 wherein said data storage means includes means controlled by control data from said central processing unit for replacing first stored message data at a specific area within said data storage means with replacement message data independent of the relative lengths between the first stored message data and the replacement message data.

12. The message delivery circuit set forth in claim 10 further including means for selectively modifying stored message data, and for transferring said modified stored message data back and forth between said communication system and said message delivery circuit via said system bus.

13. The message delivery circuit set forth in claim 12 wherein said modifying means is controlled by said central processing unit via signals on said system bus.

14. The message delivery circuit set forth in claim 10 further comprising a processor independent from said central processing unit and having a communication link to said communication system, and
    means responsive to control messages from said independent processor over said communication link for controlling the exchange of message delivery data to and from said message delivery circuit.

15. The message delivery circuit set forth in claim 10 further comprising a processor independent from said central processing unit and having a communication link to said communication system, and
   means in said independent processor responsive to control messages from said central processing unit for storing and retrieving message delivery data in said independent processor.

16. An announcement circuit for use as an adjunct to a communication system, which system includes at least one communication bus, each carrying messages which have been time-division multiplexed into a plurality of recurring channels, means for exchanging messages over said communication bus, and said announcement circuit comprising
   memory means,
   means for storing announcement messages in said memory means, said storing means storing announcement messages from said communication system appearing on said bus in at least one channel of said plurality of channels, said storing means also compressing predetermined ones of said announcement messages prior to storing in said memory means to conserve space therein, each of said predetermined announcement messages being compressed by one of a plurality of different compression factors,
   means for retrieving any one of said stored announcement messages, said retrieved announcement messages provided to said communication system via said bus in at least one other channel of said plurality of channels, and
   means operative in response to control messages communicated between said communication system and said announcement circuit over said bus for controlling said storing and said retrieving means.

17. The communication system set forth in claim 16 further including
   system memory means separate from said announcement circuit memory means and controllable by a communication system processor,
   means responsive to said communication system processor for storing selected retrieved announcement messages in said system memory,
   means responsive to said communication system processor for retrieving announcement messages from said system memory, and
   means for transmitting said retrieved announcement messages to said announcement circuit memory.

18. The communication system set forth in claim 16 wherein a communication system processor is operable for selectively modifying any said stored announcement message.

19. The communication system set forth in claim 16 further comprising a processor independent from both a system processor and an announcement cicuit processor, said independent processor having a communication link to said communication system, and
   means responsive to control messages from said independent processor over said communication link for controlling the exchange of announcement messages to and from said announcement circuit.

20. The communication system set forth in claim 16 further comprising a processor independent from both a system processor and an announcement circuit processor, said independent processor having a communication link to said communication system, and
   means in said independent processor responsive to control messages from said system processor for storing and retrieving announcement messages in said independent processor.

21. The announcement circuit of claim 16 wherein each announcement message has a size and said retrieving means expands each of said predetermined ones of said announcement message to its size prior to compression.

22. The announcement circuit of claim 16 wherein said exchanging means exchanges control messages onto at least one control channel on said bus and said controlling means is responsive to said control messages on said control channel.

* * * * *